May 21, 1963 C. W. COCHRAN 3,090,826
WIRING FASTENER
Filed Jan. 26, 1960 4 Sheets-Sheet 1
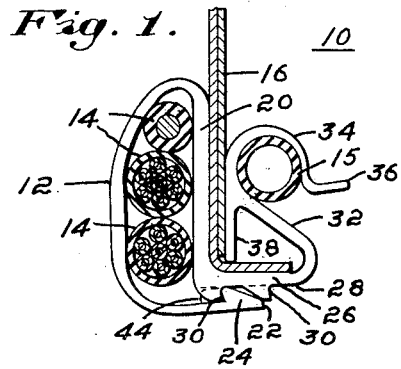
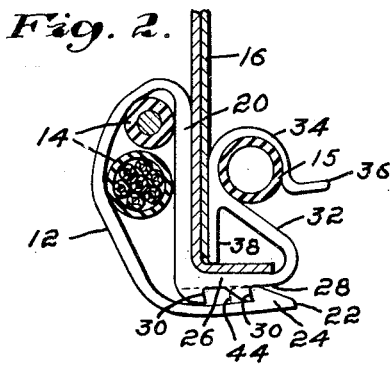
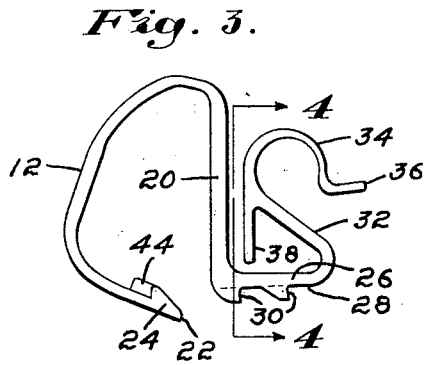
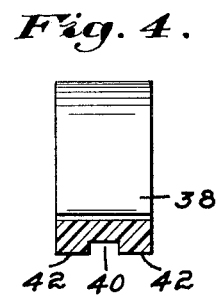
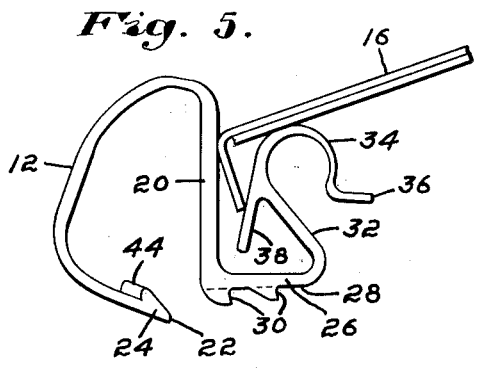
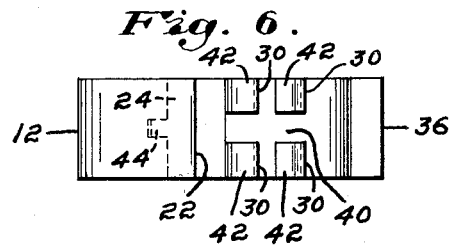
Inventor:
Clarence W. Cochran,
by James B. Tiffany Jr. Atty.

May 21, 1963  C. W. COCHRAN  3,090,826
WIRING FASTENER
Filed Jan. 26, 1960  4 Sheets-Sheet 2
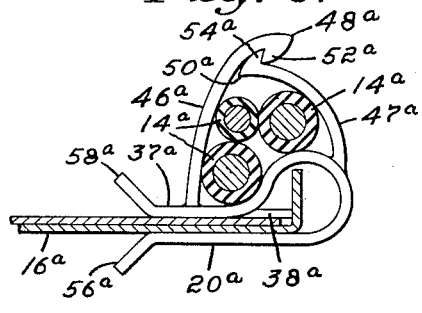
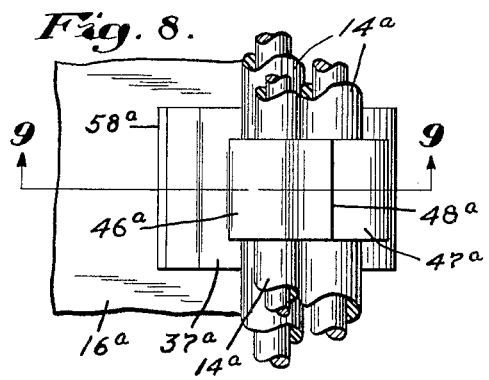
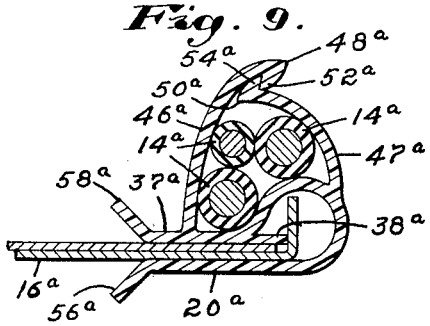
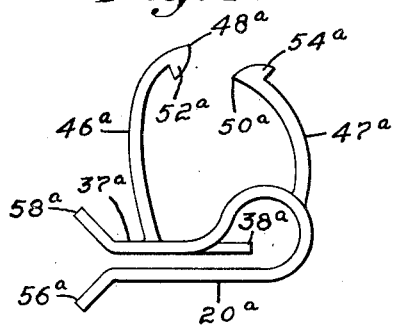
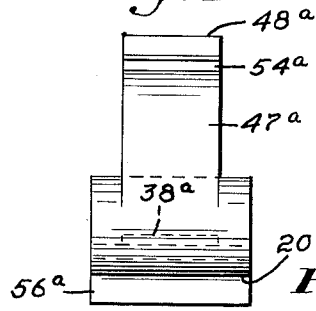
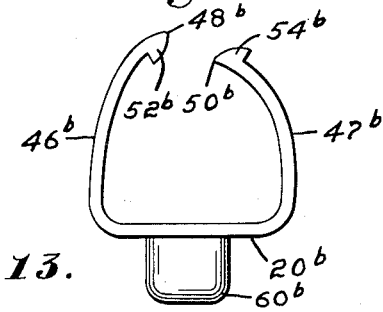
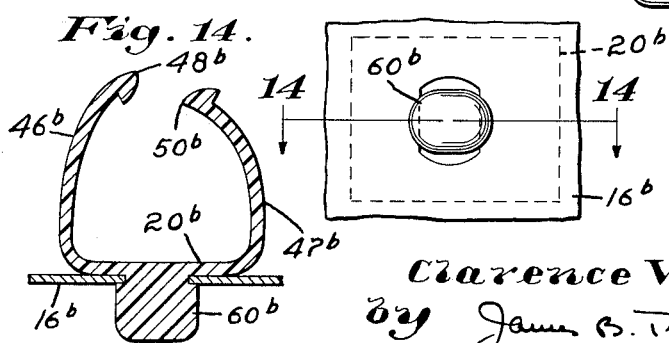
Inventor:
Clarence W. Cochran,
by James B. Tiffany Jr. Atty.

May 21, 1963 C. W. COCHRAN 3,090,826
WIRING FASTENER

Filed Jan. 26, 1960 4 Sheets-Sheet 3

Inventor:
Clarence W. Cochran,
by James B. Tippany Jr. Atty.

May 21, 1963     C. W. COCHRAN     3,090,826
WIRING FASTENER

Filed Jan. 26, 1960     4 Sheets-Sheet 4

Inventor.
Clarence W. Cochran,
by Walter S. Jones
Atty.

United States Patent Office 3,090,826
Patented May 21, 1963

3,090,826
WIRING FASTENER
Clarence W. Cochran, Belmont, Mass., assignor to
United-Carr Fastener Corporation, Cambridge, Mass.,
a corporation of Delaware
Filed Jan. 26, 1960, Ser. No. 4,783
4 Claims. (Cl. 174—158)

This invention relates to fastening devices and more particularly to a wiring fastener adapted to secure a plurality of wires to a support.

Recent developments in the automotive industry have disclosed a definite need for improved types of wiring and tubing clips which will secure a plurality of wires in assembly and having integral fastening means for attaching the clip to a flanged support.

The object of the invention is to provide an improved wiring clip or the like adapted to retain one or a plurality of wires in assembly and having integral fastening means for securing the clip to a support.

A further object of the invention is to provide a wiring clip having interlocking wiring engaging portions which are adapted to encircle a wire harness or the like after the clip has been positioned on a support.

Another object of the invention is to provide a wiring clip constructed of an electrically non-conductive material.

A further object of the invention is to provide a wiring clip having positive locking features to retain a wire harness or the like to a support.

Other objects of the invention will, in part, be obvious and will, in part, appear hereinafter.

In the drawings:

FIG. 1 is a view in side elevation of the wiring fastener mounted on a flanged support with a group of wires retained in assembly and having a tubing positioned on the opposite side of the support;

FIG. 2 is a view similar to FIG. 1 having a lesser number of wires within the fastener;

FIG. 3 is a view in side elevation of the wiring fastener;

FIG. 4 is a view in section taken on line 4—4 of FIG. 3;

FIG. 5 is a view in side elevation of the fastener being installed on a flanged support;

FIG. 6 is a bottom plan view of FIG. 3;

FIG. 7 is a side elevation of a modified form of the fastener with wires retained therein secured to a support;

FIG. 8 is a top plan view of the fastener of FIG. 7;

FIG. 9 is a section taken on line 9—9 of FIG. 8;

FIG. 10 is a view in side elevation of the modified form of the fastener with the wire retention arms unlocked;

FIG. 11 is an end view of the modified form of the fastener;

FIG. 12 is a view in side elevation of the modified form with a novel panel retaining means;

FIG. 13 is a bottom plan view of the fastener of FIG. 11 attached to an apertured support;

FIG. 14 is a view in section taken on line 14—14 of FIG. 13;

Figure 15:
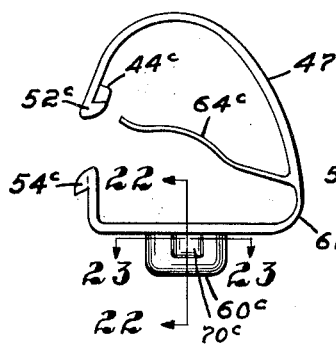
FIG. 15 is a view in side elevation showing another modified form of the fastener with one retaining arm.
Figure 16:
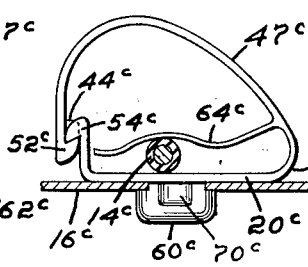
FIG. 16 is a view in elevation of the modified form of fastener of FIG. 15 in a closed position with one wire in assembly.

Referring to the drawings, there is illustrated a fastener 10 which is formed from a resilient plastic having a wire retaining portion 12 enclosing a plurality of wires 14 in assembly on a support 16.

The fastener 10 comprises a one piece device having a first arcuate wiring encircling portion 12 extending from one end of a base 20 in such a manner that a loop is formed with the distal end 22 of the wire encircling portion having a locking member 24 for a purpose to be described hereinafter. Extending from the other end of the base 20 and at substantially right angles thereto is a flange engaging portion 26 having on its outer surface 28 and adjacent to the base 20, a plurality of shoulders 30 laterally spaced from each other and adapted for cooperate snap engagement with the locking member 24 providing an adjustable fastener member. A second section 32 extends from the flange engaging portion curving arcuately backward in the direction of the base 20 and extending a distance substantially parallel thereto but spaced from the base and then curved arcuately in a direction away from the base to form a second wire or tube engaging section 34. The distal end 36 of the wire engaging section 34 extends outwardly to provide a lead to facilitate insertion of a wire 15 or the like. A second flange engaging portion 38 is formed on the wire engaging section so as to be spaced from the base 20 and cooperate therewith to retain the fastener in assembly.

As illustrated in FIG. 5, the resilient characteristics of the wiring fastener allow the second flange engaging portion 38 to flex away from the base 20 and snap backward to its original position to retain the fastener in assembly on the flanged support.

The positive locking feature of the wire encircling portion 12 as shown in FIG. 6 incorporates a lateral groove 40 formed by opposing abutments 42 of the shoulder 30 so as to prevent transverse movement of a central tab or shoulder 44 of the locking member 24. The shoulders 30 have a camming surface to facilitate interaction between the locking member 24 and the shoulders in one direction.

A modified form of this invention is shown in FIGS. 7 through 10 which may be used where a predetermined number of wires 14a are retained in assembly on a flanged support. A base 20a is bent back upon itself forming a spaced leg 37a with two dependent upwardly extending portions 46a and 47a having their terminal ends 48a and 50a formed into cooperative interlocking members 52a and 54a. The distal ends 56a and 58a of the base 20a and the spaced leg 37a extend away from each other to provide a lead to facilitate insertion of the fastener over the flanged support 16a and retention thereon by means of a flexible flange engaging portion 38a.

A further modification is illustrated in FIGS. 12–14 where the positive locking features of the fastener in FIGS. 7–10 have been utilized in a device for use with a conventional support. A base 20b has upwardly extending portions 46b and 47b spaced from each other with the distal ends 48b and 50b formed into cooperative interlocking members. Extending downwardly from the medial lateral surface of the base 20b is an oval stud 60b having major and minor axis for axial insertion within an apertured panel 16b and adapted for retention therein by rotation whereby the walls at the aperture enter into biting engagement with the stud 60b, as shown in FIGS. 13 and 14.

Figure 17:
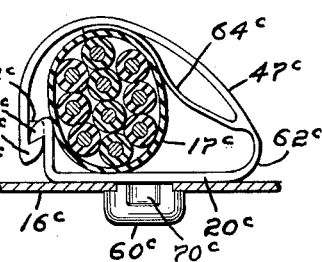
FIG. 17 is a view in elevation of the modified form of the fastener of FIG. 15 in a closed position retaining a plurality of wires in assembly.

Other modified forms of this device falling within the scope of the invention are illustrated in FIGS. 15–23 where a base 20c has an arm 47c extending arcuately from one end 62c curving arcuately back upon itself with the terminal portion formed into a locking portion 52c and adapted for interlocking snap engagement with a locking member 54c formed in the other end of the base 20c. A second arm 64c integrally formed with the first arm 47c extends substantially parallel to the base 20c so as to lie within the area enclosed by the base 20c and the first arm 47c in such a manner as to retain wiring 14c in abutting relationship with the base 20c. As illustrated in FIG. 17, the second arm 64c will flex upwardly to retain tension on a large wiring harness 17c so as to be universal with respect to a variety of wiring needs.

Figure 18:
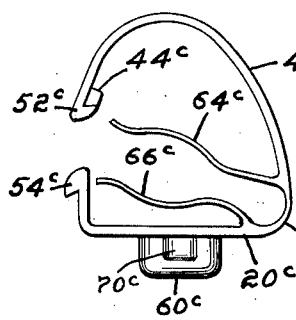
FIG. 18 is a view in elevation of another modified form of the fastener having two retaining arms.
Figure 19:
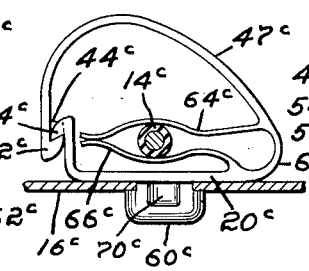
FIG. 19 is a view in elevation of the modified form of fastener of FIG. 18 in a closed position with one wire in assembly.
Figure 20:
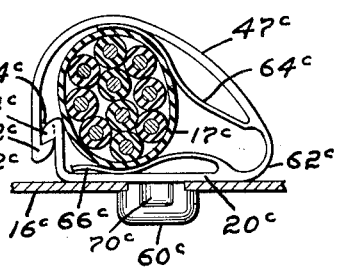
FIG. 20 is a view in elevation of the modified form of the fastener of FIG. 18 in a closed position retaining a plurality of wires in assembly.

FIGS. 18–20 illustrate a third arm 66c extending from the first arm 47c and substantially parallel to the second arm 64c in such a manner as to retain one or a plurality of wires between the second and third arms.

Figure 21:
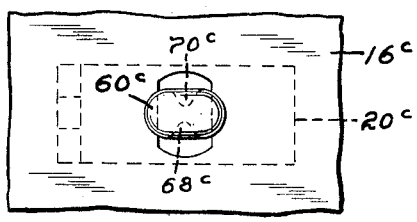
FIG. 21 is a bottom plan view of the fastener illustrating another means of retention in a supporting panel.
Figure 22:
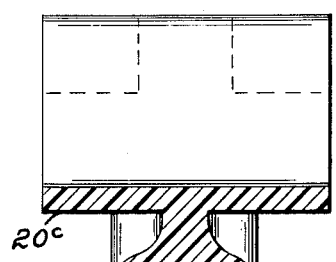
FIG. 22 is a view in section taken on line 22—22 of FIG. 15.
Figure 23:
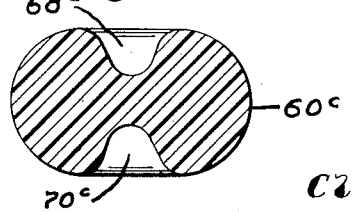
FIG. 23 is a view in section taken on line 23—23 of FIG. 15.

FIGS. 21–23 illustrate a further modification of the oval stud 60c where in the interests of greater flexibility and holding power, cutout portions 68c and 70c are formed in the opposing lateral surface of the minor axis which will allow the major axis to flex slightly inward to compensate for irregularities in hole sizes within the apertured plate.

Figure 24:
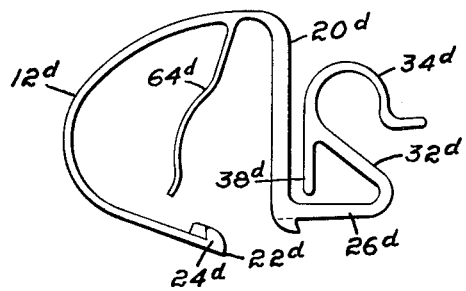
FIG. 24 is a side elevation of the variation of the fastener shown in FIGS. 1 through 6.
Figure 25:
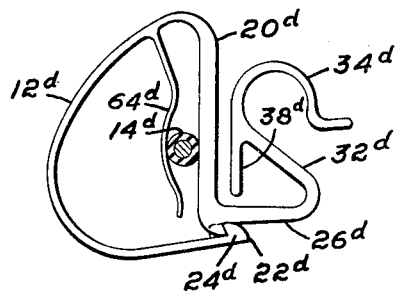
FIG. 25 is a side elevation of the fastener shown in FIG. 24 with a wire engaged.

FIGS. 24 and 25 illustrate a further modification of the fastening device combining the fastener disclosure in FIGS. 1 through 6 and utilizing the flexible arm which is set within the first loop. This modification comprises a base portion 20d having a first arcuate wire-encircling portion 12d extending from one end of the base 20d in such a manner that a loop is formed with the distal end 22d of the wire-encircling portion having a locking member 24d for a purpose described herein for the similar type of distal end 22 of the fastener 10. Extending from the other end of the base 20d and at substantially right angles thereto is a flange-engaging portion 26d which is formed in identical manner as the flange-engaging portion 26 of the fastener 10. A second section 32d, which is similar in all respects to the second section 32 of the fastener 10, extends from the flange-engaging portion 26d and curves arcuately backward in the direction of the base 20d and also extends a distance substantially parallel to but spaced from the base and then curves arcuately in a direction away from the base to form a second or tube-engaging section 34d. A second flange-engaging portion 38d is formed on the tube-engaging section 34d so as to be spaced from the base 20d and cooperate therewith to retain the fastener in assembly. An arm 64d is integrally formed from the wire-encircling portion 12d extending substantially parallel to the base 20d so as to lie within the area enclosed by the base 20d and the wire-encircling portion 12d in such a manner as to retain the wiring 14d in abutting relationship with the base 20d, that is, between the arm 64d and the base portion 20d.

Since certain other obvious modifications may be made in this device without departing from the scope of the invention, it is intended that all matter contained herein be interpreted in an illustrative and not in a limiting sense.

I claim:
1. A resilient adjustable electrically non-conductive clamping device adapted to retain a plurality of wires or the like on a flanged support comprising a base, one end of said base curving backwardly upon itself forming a first loop having its distal end formed into a grooved hook locking member for cooperative snap engagement with camming shoulders formed on a substantially right angular extension of the other end of said base, said right angular extension curving backwardly on itself forming a second loop portion spaced from said first loop, a flexible flange retaining member projecting from said second loop cooperating with the base of said first loop to retain the clamping device in assembly on said flanged support.

2. A resilient electrically non-conductive clamping device adapted to retain a plurality of wires or the like on a flanged support, comprising a base having one end arcuately extending back upon itself defining an open ended portion, at least one tensioning arm extending from the inner surface of a said loop and spaced between said base and said arcuately extending end, a grooved hook portion on said end for cooperative snap engagement with shoulders formed on a right angular projecting of said base, and a second loop portion extending from said projection having a flexible finger substantially parallel to said base and cooperating therewith to retain the flange of said support therebetween.

3. A one-piece adjustable fastener for wiring or the like formed from a single piece of resilient non-conductive material and including a first open-ended loop disposed on one surface of a panel, said first open loop having distal ends adapted for cooperative snap engagement and a second open loop spaced from said first loop and disposed at least partly on the opposite face of a supporting panel, said second open loop having means to retain said panel between said first and second loops and both of said loops opening in the same general direction.

4. A one-piece adjustable fastener as set forth in claim 3 wherein said distal ends of said first open loop have tab and grooved elements co-operating to prevent transverse lateral disengagement of the hook-like portions when they have engaged.

References Cited in the file of this patent

UNITED STATES PATENTS

| 2,372,683 | Robertson | Apr. 3, 1945 |
| 2,504,086 | Peters | Apr. 11, 1950 |
| 2,836,215 | Rapata | May 27, 1958 |
| 2,936,980 | Rapata | May 17, 1960 |

FOREIGN PATENTS

| 709,926 | Great Britain | June 2, 1954 |
| 1,046,614 | France | July 15, 1953 |
| 189,262 | Austria | Mar. 11, 1957 |
| 1,053,080 | France | Sept. 30, 1953 |
| 1,012,983 | Germany | Aug. 1, 1957 |

OTHER REFERENCES

Publication: F. W. Hill, "Cable Harness Clamp," IBM Technical Disclosure Bulletin, vol. 2, No. 1, June 1959, page 3.